United States Patent
Wu et al.

(10) Patent No.: US 8,337,995 B2
(45) Date of Patent: Dec. 25, 2012

(54) LOW PENETRATION LOW FORMALDEHYDE ALKYD COMPOSITION

(75) Inventors: Shaobing Wu, Jamestown, NC (US); Thomas J. Melnyk, Greenfield, MN (US); William E. Hale, High Point, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/139,997

(22) PCT Filed: Dec. 18, 2009

(86) PCT No.: PCT/US2009/068807
§ 371 (c)(1), (2), (4) Date: Jun. 15, 2011

(87) PCT Pub. No.: WO2010/071829
PCT Pub. Date: Jun. 24, 2010

(65) Prior Publication Data
US 2011/0262759 A1    Oct. 27, 2011

Related U.S. Application Data

(60) Provisional application No. 61/139,455, filed on Dec. 19, 2008.

(51) Int. Cl.
B32B 23/04    (2006.01)

(52) U.S. Cl. ..... 428/532; 428/535; 428/536; 428/537.1; 427/384

(58) Field of Classification Search ............... 428/532, 428/535, 536, 537.1; 427/384
See application file for complete search history.

(56) References Cited

U.S. PATENT DOCUMENTS

| | | | |
|---|---|---|---|
| 2,233,875 A | 3/1941 | Schmidt et al. | |
| 4,133,786 A | 1/1979 | Harris et al. | |
| 4,267,239 A | 5/1981 | Thankachan et al. | |
| 4,298,658 A | 11/1981 | Thankachan et al. | |
| 4,447,567 A | 5/1984 | Geerdes et al. | |
| 4,450,247 A | 5/1984 | Crockatt et al. | |
| 4,505,986 A | 3/1985 | Geerdes et al. | |
| 4,517,322 A | 5/1985 | Birkmeyer et al. | |
| 4,539,047 A | 9/1985 | Crockatt et al. | |
| 5,480,680 A * | 1/1996 | Vieyra | 427/388.4 |
| 6,464,764 B1 | 10/2002 | Lichtenberg et al. | |
| 6,469,096 B1 | 10/2002 | Urbano et al. | |
| 6,548,565 B1 | 4/2003 | VanDenBerg et al. | |
| 6,794,055 B2 | 9/2004 | Dean et al. | |
| 6,887,953 B2 | 5/2005 | Eng | |
| 6,946,509 B2 * | 9/2005 | He | 524/413 |
| 7,001,667 B2 | 2/2006 | Dean et al. | |
| 7,220,802 B2 | 5/2007 | Julien et al. | |
| 7,371,792 B2 | 5/2008 | Pogue | |
| 7,387,843 B2 | 6/2008 | Dean et al. | |
| 2005/0238898 A1 * | 10/2005 | Wind et al. | 428/480 |
| 2006/0194922 A1 | 8/2006 | Reidlinger et al. | |
| 2007/0098903 A1 * | 5/2007 | Hurd et al. | 427/372.2 |
| 2007/0167603 A1 | 7/2007 | Urbano et al. | |
| 2008/0275192 A1 * | 11/2008 | Melnyk et al. | 525/418 |

FOREIGN PATENT DOCUMENTS

| | | |
|---|---|---|
| EP | 0 407 796 B1 | 1/1991 |
| JP | 20044238524 | 8/2004 |
| WO | WO 02/076696 A1 | 10/2002 |

OTHER PUBLICATIONS

Cymel® 303 Crosslinking Agent Data Sheets, CYTEC Industries Inc., 26 pages, (1995).
Cymel® Resins for coatings and specialty applications, CYTEC Industries Inc., 23 pages (2000).
Hexion™ Specialty Chemicals Technical Data Sheet, "Duramac 207-1109 Short Oil Alkyd Resin", 2 pages, date unknown but downloaded on Sep. 26, 2008 from: http://www.hexion.com/Products/TechnicalDataSheet.aspx?id=2214.
DSM Coating Resins Product Overview Brochure, "Industrial Wood Coating Resins", 4 pages, (Aug. 2005).
DSM NeoResins, "Advanced Polymer Technologies for Industrial Wood Coatings", 18 pages, (Apr. 2008).

* cited by examiner

*Primary Examiner* — Leszek Kiliman
(74) *Attorney, Agent, or Firm* — IPLM Group, P.A.

(57) ABSTRACT

Soak-in and strike through on the exposed end grain portions of low density or porous wood substrates including alder, birch, pine, poplar, and soft maple are reduced by applying to the end grain a solvent-borne coating composition containing an (i) alkyd resin having a hydroxyl number less than about 150, (ii) acid catalyst and (iii) cross linker. The resin desirably has a number average molecular weight greater than about 2000, and may have a Gardner coloration less than about 3 or may be a short oil alkyd based on coconut oil. By using a reduced hydroxyl number alkyd resin, a reduced cross linker amount may be employed, thereby reducing formaldehyde evolution in compositions made with methylated amino resin cross linkers such as methylated melamine resins.

19 Claims, 4 Drawing Sheets

LOW PENETRATION LOW FORMALDEHYDE ALKYD COMPOSITION

CROSS REFERENCE TO RELATED APPLICATIONS

This application is national stage filing under 35 U.S.C. §371 of International Application No. PCT/US2009/068807 filed 18 Dec. 2009, which claims priority under 35 U.S.C. §119 to U.S. Provisional Application No. 61/139,455 filed 19 Dec. 2008.

FIELD

This invention relates to alkyds and their use in solvent-borne coatings for wood substrates.

BACKGROUND

Figure 1:
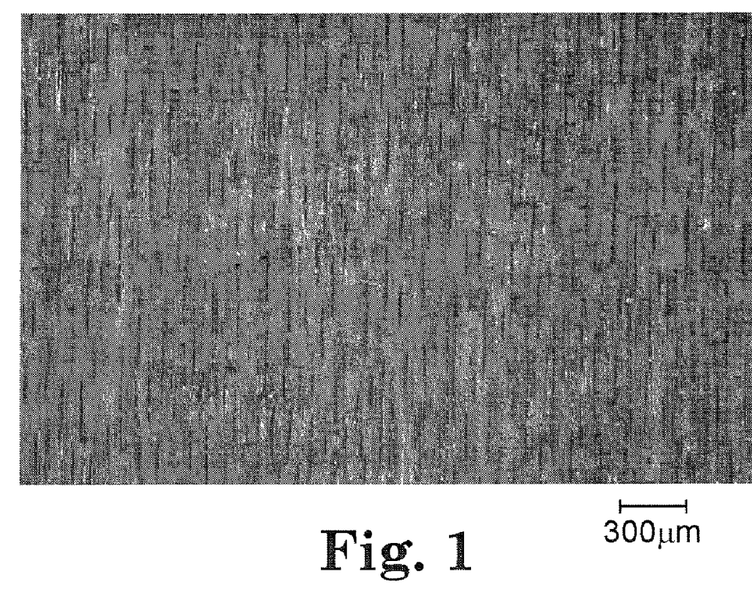
FIG. 1 is a photograph of a face grain surface on an alder wood panel.
Figure 2:
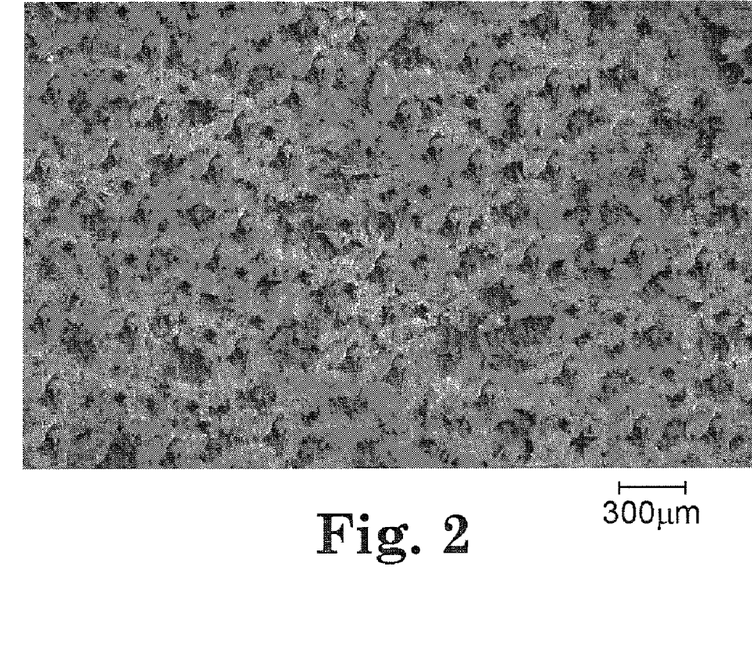
FIG. 2 is a photograph of an end grain surface on an alder wood panel.

Solvent-borne alkyd coating compositions are widely used in wood coating applications, for example to coat kitchen cabinetry and other wooden furnishings. These coating compositions are mainly based on alkyd formulations catalyzed with acids and crosslinked with alkylated amino resins (e.g., alkylated melamine or alkylated urea resins). Current commercially available alkyd coating compositions generally provide acceptable results when one or more coats are applied on face grain surfaces (see e.g., the FIG. 1 photograph of a face grain portion of an uncoated alder wood panel) or on end grain surfaces of tight-grained woods such as hard maple, oak and hickory. However, when coating the exposed end grain portions of low density or porous woods such as alder, birch, pine, poplar, and soft maple (see e.g., the FIG. 2 photograph of an end grain portion of an uncoated alder wood panel), conventional alkyd coatings may exhibit excessive soak-in, striking, or roughness, and may require one or more and often two or more extra coats (beyond the one or two coats normally employed on face grain surfaces) in order to obtain a finished end grain surface with an acceptable finish and appearance. The extra coats increase the overall finish cost and required manufacturing time, and may reduce factory throughput.

SUMMARY OF THE INVENTION

We have found that improved results may be obtained when applying a coating composition to the exposed end grain portions of low density or porous wood substrates (for example, alder, birch, pine, poplar, soft maple, fiberboard and some engineered woods) when the coating composition employs an alkyd resin having a hydroxyl number less than about 150. The resulting coating composition has a reduced tendency to penetrate excessively into porous end grain, and is less likely to exhibit strikethrough. Using a reduced hydroxyl number alkyd resin also makes it possible to use a reduced crosslinker amount, thereby reducing formaldehyde evolution in compositions made using formaldehyde-releasing crosslinkers such as methylated melamine resins.

The invention thus provides, in one aspect, a method for coating a wood substrate comprising an exposed end grain portion of low density or porous wood, which method comprises applying to such substrate a solvent-borne coating composition comprising an (i) alkyd resin having a hydroxyl number less than about 150, (ii) acid catalyst and (iii) crosslinker. In one exemplary embodiment, the alkyd resin has a number average molecular weight greater than about 2000. In other exemplary embodiments, the alkyd resin has a Gardner coloration less than about 3 or is a short oil alkyd based on coconut oil.

The invention provides, in another aspect, a coated wood article comprising an end grain portion of low density or porous wood, such portion having thereon a coating composition comprising an (i) alkyd resin having a hydroxyl number less than about 150, (ii) acid catalyst and (iii) crosslinker.

The invention provides, in yet another aspect, a coating composition comprising an alkyd resin having a hydroxyl number less than about 150, number average molecular weight greater than about 2000 and Gardner coloration less than about 3, together with an acid catalyst and alkylated amino resin crosslinker.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a coating composition that contains "an" additive means that the coating composition may include "one or more" additives.

The phrase "acid number" means the milligrams of potassium hydroxide required to neutralize one gram of polymer solids, and may be evaluated according to ASTM D 974-04.

The phrase "end grain" refers to a wood surface having fibers generally aligned at about 45 to about 135° with respect to the surface, and will be construed to include wood surfaces made of natural woods, engineered wood and fiberboard.

The phrase "esterified polymerization product" means a polymerization product of monomers that are capable of being synthesized from esterification or transesterification reactions of one or more polyols and one or more aliphatic or aromatic polycarboxylic acids.

The phrase "hydroxyl number" means the milligrams of potassium hydroxide required to neutralize one gram of polymer solids whose hydroxyl groups have been acetylated using acetic anhydride, and may be evaluated according to ASTM D 1957-86 (Reapproved 2001).

The phrase "low penetration" when used with respect to a coating composition means that the composition if spray-applied as a single wet coat over an unfinished, freshly-sanded alder end grain surface will after drying or curing provide a continuous or semicontinuous film over a majority of the application area. The continuous or semicontinuous portions of such film need not be smooth and glossy and may instead have a frosty or other non-smooth or non-glossy appearance, and the discontinuous portions of the application area may exhibit a darkened or otherwise discolored wood surface with an apparent localized absence of continuous film coverage.

The phrase "non-viscometric technique" means a method for monitoring the progress of a polymer-forming reaction without requiring a viscosity measurement.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The phrase "solids content" refers to the percent by weight of non-volatile components in a composition, and may be evaluated according to ASTM D 1259-85. For example, an alkyd resin with an 80 percent solids content will contain 80 weight percent non-volatile components and 20 weight percent volatile components.

The term "strikethrough" when used with respect to an applied coating means that one or more portions of the coating or even all the coating has soaked into the underlying substrate sufficiently so that the coating is not continuous.

When used with respect to a component which may be found in a mixture, the phrase "substantially free of" means containing less than about 5 wt. % of the component based on the mixture weight.

The recitation of a numerical range using endpoints includes all numbers subsumed within that range (e.g., 1 to 5 includes 1, 1.5, 2, 2.75, 3, 3.80, 4, 5, etc.).

Alkyd resins for use in the disclosed method, article and composition may be prepared using a variety of techniques, including those described in U.S. Pat. Nos. 4,133,786, 4,517, 322, and 6,946,509 B2, and in U.S. Patent Application Publication No. US 2008/0275192 A1. The alkyd resin desirably is the reaction product of a polyester component and a fatty acid component, and the polyester component desirably is the reaction product of an acid component and a polyol component. However made, the various alkyd resin reactants may be added to a reaction vessel at the same time or added sequentially in any suitable order or grouping. One or more time delays may be included between reactant additions.

Exemplary acid components include aromatic or aliphatic polycarboxylic acids, their anhydrides, and esterified polymerization products of one more polyols and one or more of such polycarboxylic acids or their anhydrides. The acid component may for example be difunctional (e.g., phthalic acid), or trifunctional (e.g., trimellitic acid), with difunctional acids and their anhydrides being preferred. Non-limiting examples of difunctional acids include ortho-phthalic acid, isophthalic acid, terephthalic acid, tetrahydrophthalic acid, succinic acid, adipic acid, naphthalene dicarboxylic acid, anhydrides of these (e.g., phthalic anhydride), mixtures thereof and the like. The acid may be unsaturated (e.g., maleic acid, fumaric acid, itaconic acid or a dimerized fatty acid) or saturated (e.g., succinic acid). The reaction mixture may if desired contain minor amounts of monocarboxylic acids or esters or minor amounts of tetra- or higher carboxylic acids, esters or their anhydrides, including but not limited to ethylhexanoic acid, propionic acid, benzoic acid, 4-methylbenzoic acid, 1,2,4,5-benzenetetracarboxylic acid. Exemplary esterified polymerization products include polyethylene terephthalates. The esterified polymerization products may also be post-consumer materials.

Exemplary polyol components include difunctional alcohols, trifunctional alcohols (e.g., glycerin, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Trifunctional alcohols are preferred due to the degree of branching they promote at relatively low monomer cost, and branching is desired to build molecular weight and discourage excessive soak-in. Difunctional alcohols (or diols), if used, are preferably used in combination with trifunctional or higher alcohols. Exemplary diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexane-dimethanol, 1,4-cyclohexanedimethanol, 2,2,4-trimethyl-1,3-pentanediol, 2,2,4-tetramethyl-1,3-cyclobutanediol, p-xylenediol, hydroxypivalylhydroxypivalate, 1,10-decanediol, hydrogenated bisphenol A and mixtures thereof. Exemplary trifunctional alcohols (or triols) include glycerin, trimethylolpropane, trimethylolethane, trimethylolbutane, pentaerythritol and dipentaerythritol and mixtures thereof. Glycerin and pentaerythritol are preferred triols.

The acid component and polyol components are preferably employed in amounts sufficient to form a polyester component suitable for obtaining a product alkyd resin having the desired hydroxyl number. The equivalent ratio of acid component functionality to polyol component functionality desirably is greater than 1:1 and more desirably greater than 1.1:1.

A variety of fatty acids may be reacted with the polyester component. While not intending to be bound by theory, appropriate selection of the fatty acid component may affect the alkyd resin color or the extent to which the coating composition may undergo "yellowing" after cure. For unpigmented coatings, the alkyd resin preferably has a Gardner coloration of 3 or less and more preferably less than 3, as measured using the procedure described in ASTM D1544-04. Alkyd resins with greater Gardner coloration may be used where resin color or yellowing are not a concern (e.g., in appropriately pigmented compositions), or may find use in moderation where some resin coloration or yellowing is acceptable. The fatty acid component preferably includes one or more substantially saturated naturally occurring fatty acids. Preferably, the fatty acid component contains up to 18, and more preferably between about 6 and 16 carbon atoms. Exemplary substantially saturated fatty acids include palmitic acid, lauric acid, stearic acid, capric, caprylic acid, myristic acid, arachidic acid, behenic acid, lignoceric acid, and the like. Unsaturated fatty acids, including polyunsaturated fatty acids and partially but not fully hydrogenated unsaturated fatty acids, may also be employed. Exemplary unsaturated fatty acids include linolenic acid (C18:3); linoleic acid (C-18:2); and oleic acid (C-18:1). Naturally occurring fatty acids may also be employed, including those which are largely saturated (e.g., coconut oil and palm kernel oil) and those with appreciable unsaturation (e.g., castor oil, tall oil fatty acid, linseed oil, soybean oil, palm oil, and safflower oils). Coconut oil is a preferred and economical fatty acid and can be used to make alkyd resins with low Gardner coloration. The fatty acid component is employed in an amount suitable to provide a product alkyd resin having the desired properties, including the desired hydroxyl number. The fatty acid component may for example represent between about 20 and about 40 weight percent, between about 25 and about 40 weight percent, or between about 30 and about 35 weight percent of the alkyd resin.

Polycondensation (viz., polymerization and chain growth of the alkyd resin) preferably is carried out at a temperature of at least about 150° C., and more preferably at a temperature of at least about 200° C. In some embodiments, polycondensation is carried out at a temperature of less than about 280° C., of less than about 250° C. Water produced during formation of the alkyd resin may be removed using any methods known in the art, including the use of distillation columns, distilling under reduced pressures, azeotropic distillation using a suitable organic solvent (e.g., xylene), or combinations thereof. In embodiments employing an esterified polymerization product (e.g., a polyethylene terephthalate), the polymerization reaction desirably generates substantially no water as a condensate by-product. This is beneficial for providing high yields of reaction, while reducing the waste stream.

An alkyl resin formation catalyst (e.g., lithium) may be included in the reaction mixture to assist in alkyd resin production. A gas (e.g., an inert gas) may optionally be passed through the reaction mixture. In some situations, undesirable side reactions may occur if steps are not taken to minimize or eliminate their occurrence. These undesirable side reactions may adversely affect the properties of the alkyd resin (e.g., color, molecular weight, acid number, hydroxyl number, viscosity, etc.), reduce the total alkyd resin yield, or result in the production of undesirable substances. Preferably, care is taken during the resin synthesis to avoid overshooting the desired hydroxyl number. The hydroxyl number is as noted above less than 150, and may for example be about 50 to about 150, about 70 to about 150 or about 80 to about 140. When forming high molecular weight alkyd resins using typical interval sampling techniques and viscometric measuring to monitor the reaction progress, it may be all too easy to overshoot the desired reaction endpoint. Alternative monitoring methods such as the use of an inline continuous viscometer or a non-viscometric monitoring technique may make it easier to halt the reaction near a desired endpoint. Exemplary non-viscometric monitoring techniques include monitoring stirrer torque, using near-IR analysis to measure the disappearance of hydroxyl and acid groups, and using nuclear magnetic resonance as described in U.S. Pat. No. 6,887,953 B2. The measurement results may also be used to determine whether additional starting material (e.g., additional acid, glycol or fatty acid) should be added to the reactor to correct the reaction mixture and assist in reaching a targeted alkyd resin product. Non-viscometric techniques may also be combined with one another or with viscometric techniques to provide improved reaction monitoring.

In some embodiments, the alkyd resin may have an acid number of at least about 1, or at least about 5. In some embodiments, the alkyd resin may have an acid number less than about 20, or less than about 10.

The alkyd resin preferably has a molecular weight and viscosity sufficient to permit rapid flow and leveling to form a smooth, continuously glossy coating on porous end grain wood without excessive strikethrough or even without any strikethrough. The desired molecular weight and viscosity may be greater than the values customarily found in alkyd resins used for coating wood face grain. This may be compensated for by also using a higher than normal solvent amount or lower than normal solids level in the coating composition. The alkyd resin number average molecular weight preferably is at least about 2,000, and may for example be between about 2,000 and about 7,000, between about 2,500 and about 6,000, or between about 2,500 and about 5,000 as evaluated using gel permeation chromatography and a polystyrene standard. The alkyd resin kinematic viscosity preferably is less than about 95 cm$^2$/second or Stokes, as measured using a 70 wt. % solution of the alkyd resin in a 28:2 by weight butyl acetate:xylene mixture, a 25° C. sample temperature and the procedure described in ASTM D 1545-07. The results may be reported in bubble seconds or approximate Stokes, or alternatively may be determined using Gardner-Holdt tubes, and may be converted to Stokes using the tabular comparisons provided in ASTM D-1545-07. The kinematic viscosity of the alkyd resin solution may as noted above be less than about 95 Stokes (less than Gardner-Holdt Z5) or less than about 70 Stokes (less than Gardner-Holdt Z4), and may for example be greater than about 37 Stokes (greater than Gardner-Holdt Z2) or greater than about 45 Stokes (greater than Gardner-Holdt Z3).

The alkyd resin component preferably is employed in the disclosed coating compositions in an amount sufficient to evenly coat wood end grain in two coats (or better yet one coat) without strikethrough. For example, the disclosed coating compositions may include at least about 20, at least about 30 or at least about 40 weight percent alkyd resin component, based on the total coating composition weight including solvents. Exemplary amount ranges for the alkyd resin component are between about 20 and about 80, between about 30 and about 70, or between about 40 and about 60 weight percent of the total coating composition weight.

The disclosed coating compositions may and typically will include an acid catalyst to enhance reactions between the alkyd resin and other components such as reactive diluents and crosslinkers. Exemplary acid catalysts may be inorganic or organic, and include sulfonic acids such as paratoluene sulfonic acid, dodecylbenzene sulfonic acid, and the, like, phosphorus acids such as ethyl acid phosphate and the like, and mixtures thereof. The catalyst may for example represent between about 0.5 and about 7 or between about 2 and about 4 weight percent of the coating composition.

The disclosed coating compositions may and typically will include a crosslinker. The crosslinker is preferably present in an amount sufficient to enable effective crosslinking of reactants in the coating composition within desired ranges of temperature and time. Exemplary crosslinkers include amino resins, e.g., alkylated amino resins, and blocked polyisocyanates. For example, the crosslinker may be a formaldehyde-releasing crosslinker such as a methylated melamine, urea, benzoguanamine or glycoluril resin, and the like. A variety of amino resin crosslinkers are available from Cytec Industries of Patterson, N.J. under the CYMEL™ name, including CYMEL 303, U 1051 and 1156 crosslinkers. The crosslinker amount may affect factors such as coating hardness, abrasion resistance, and coating flexibility. The crosslinker may for example be present in amounts of less than about 40 weight percent, less than about 30 weight percent or less than about 20 weight percent of the coating composition. When the crosslinker is a formaldehyde-releasing methylated amino resin crosslinker, it desirably is employed in even lower amounts (e.g., less than about 15, less than about 14, less than about 13, less than about 12 or less than about 10 weight percent of the coating composition) as doing so may provide acceptable crosslinking of the disclosed low hydroxyl number alkyd resins with reduced formaldehyde evolution. Depending upon the alkyd resin molecular weight and the chosen crosslinker, recommended lower limits for the crosslinker amount are at least about 2, at least about 3, at least about 4 or at least about 5 weight percent of the coating composition.

The disclosed coating compositions may and typically will include one or more solvents. A solvent may function as a carrier for the other components of the coating composition or facilitate the blending of ingredients into a composition suitable for coating or processing, etc. Exemplary solvents include aliphatic and aromatic solvents such as mineral spirits, xylene, alcohols, ketones, esters, glycol ethers, and the like. Mixtures of solvents may be employed, for example, aromatic distillates may be combined with glycol ethers or alcohols. The coating composition may for example contain about 20 to about 50 or about 30 to about 45 weight percent solvent based on the total composition weight.

An optional reactive diluent or resin may be included in the coating composition. The reactive diluent or resin may be incorporated in the coating composition to facilitate blending of the components of the coating composition, to increase the solids content at application without increasing the coating viscosity or VOC content, or to enhance (in some cases, synergistically) various coating performance characteristics such as adhesion, hardness and chemical resistance. Suitable reactive diluents or resins include vinyl resins, acrylic resins, epoxy resins, oligomers, polyether polyols, and a variety of low molecular weight polyfunctional resins. The optional reactive diluent or resin may for example represent less than about 20 weight percent, between about 1 and about 15 weight percent, between about 1 and about 10 weight percent, or between about 1 and about 5 weight percent of the coating composition.

The disclosed coating compositions may optionally include one or more waxes. A wax may provide lubricity to the composition or abrasion resistance to a finished coated substrate. Exemplary waxes include natural and synthetic waxes such as carnauba wax, petrolatum wax, polyethylene waxes, polymeric waxes, LANOCERIN™ lanolin wax (from Lubrizol Corporation), and the like. The wax may for example represent less than about 2 weight percent, between about 0.5 and about 1.8 weight percent, between about 0.7 and about 1.4 weight percent, or between about 0.9 and about 1.1 weight percent of the coating composition.

The disclosed coating compositions may include one or more flow control agents. Flow control agents may facilitate coating the composition onto a substrate. Exemplary flow control agents include silicones, fluorocarbons, acrylic resins, and the like. A flow control agent may for example represent between about 0.1 and about 3 weight percent, between about 0.4 and about 2 weight percent, or between about 0.5 and 1.5 weight percent of the coating composition.

The disclosed coating compositions may be clear or pigmented as desired. A pigment may for example represent between about 0.1 and about 40 weight percent or between about 1 and about 20 weight percent of the coating composition.

The disclosed coating compositions may if desired include other adjuvants including dyes, fillers, thickeners, dispersing aids, flow modifiers, viscosity modifiers, UV absorbers, inhibitors and binders. The amounts and types of such adjuvants will be familiar to or may readily be selected by persons having ordinary skill in the art.

The disclosed coating compositions may be applied to a variety of surfaces, including plastic, metal, masonry and especially wood surfaces. Exemplary woods include hardwood species such as ash, alder, birch, cherry, mahogany, maple, oak, poplar, teak, hickory and walnut, and softwood species such as cedar, fir, pine and redwood. The disclosed coating compositions exhibit desirably low strikethrough on porous wood end grain surfaces such as alder, birch, pine, poplar, and soft maple. The resulting finished veneered wood products can have a wide variety of uses including furniture, kitchen cabinetry, engineered flooring and veneered doors and trim. The finishing system components can be applied using a variety of methods that will be familiar to those skilled in the art, including spraying, brushing, roller coating and flood coating. Spraying and roller coating are preferred application methods. The target surface may be cleaned and prepared for application of the disclosed coating system using methods (e.g., sanding) that will be familiar to those skilled in the art. Each layer preferably is applied in an amount sufficient to provide good wet coat coverage and a continuous dried coating. Sufficient coats preferably are applied at coating weights sufficient to provide an uppermost coating layer which is continuously glossy before and after drying and exhibits no strikethrough or runs. On porous wood end grain, this preferably can be accomplished using three or fewer coats and more preferably using two coats or even one coat, at recommended wet coating thicknesses of about 0.05 to about 0.08 mm. The applied layers should be exposed to sufficient drying conditions (e.g., sufficient heat or air) to obtain thorough cure. These conditions may be determined empirically based on the particular equipment and wood species employed, and the surrounding atmosphere, throughput rate and ambient or elevated temperature at the application site. A sanding step and a de-nibbing step for appearance improvement may be employed after any or all layers of the disclosed coating composition have been applied and cured, and the coating composition may be overcoated with one or more additional layers of sealer, stain, primer or topcoat.

The invention is further described in the following Examples, in which all parts and percentages are by weight unless otherwise indicated.

Comparison Example 1 and Example 1

Alkyd Resin Preparation

The ingredients shown below in Table 1 were charged to a mixing vessel equipped with an agitator, distillation column, condenser, thermometer, and inert gas inlet. In order to reduce the extent to which side reactions occurred, a reduced batch temperature was employed when making the Example 1 resin. The Gardner-Holdt viscosity for a 70 wt. % solution of the alkyd resin and the acid number for the neat resin were measured to assess the reaction progress and arrive at a desired final number average molecular weight. The Gardner-Holdt viscosity measurements used the solvent mixtures shown below in Table 1. Similar results for the Comparison Example 1 resin would be obtained using 28:2 butyl acetate:xylene.

TABLE 1

| Ingredient | Comparison Example 1 | Example 1 |
| --- | --- | --- |
| Coconut Oil | 31.23 | 32.63 |
| Maleic Acid | 0.67 | 0.63 |
| Phthalic Anhydride | 40.21 | 40.73 |
| Pentaerythritol | 19.57 | 17.57 |
| Ethylene glycol | 8.32 | 8.44 |
| Reaction Temperature | 232° C. | 220° C. |
| Alkyd Resin Properties | | |
| $M_n$ | 1,819 | 3,245 |
| 70 wt. % Solution Density (Solvents) | 1.06 g/cm$^3$ (18:10:2 Isobutanol:Toluene:Xylene) | 1.07 g/cm$^3$ (28:2 Butyl Acetate:Xylene) |
| Gardner-Holdt Viscosity (Resin Solution) | Z2-Z3 | Z4-Z5 |
| Hydroxyl Number | 172 | 131 |
| Acid Value | 5 Maximum | 4.2 |
| Gardner Coloration | 3 Maximum | 1-2 |
| % Non-Volatiles, 1 gm heated for 1 hour @ 150° C. | 70 ± 0.7 | 70.40 |
| Appearance | Clear | Clear |

As shown in Table 1, the Example 1 resin had a lower hydroxyl number, greater number average molecular weight and greater viscosity than the Comparison Example 1 resin.

Comparison Examples 2-3 and Example 2

Wood Coating Compositions

Wood coating compositions were prepared using (a) the Comparison Example 1 alkyd resin, (b) a commercially available coconut oil-based short oil alkyd resin (from Hexion Specialty Chemicals) having a number average molecular weight below 2000 and a hydroxyl number of about 175, and (c) the Example 1 alkyd resin. These three coating compositions are respectively identified in Table 2 below as Comparison Example 2, Comparison Example 3, and Example 2. The coating compositions included an iso-butylated urea resin crosslinker (from Cytec Industries Inc), an acid catalyst and solvents. The ingredients are shown below in Table 2:

TABLE 2

| Ingredient | Comparison Example 2 | Comparison Example 3 | Example 2 |
|---|---|---|---|
| Comparison Example 1 Alkyd | 35.92 | | |
| DURAMAC ™ 207-1109 Alkyd | | 35.92 | |
| Example 1 Alkyd | | | 35.92 |
| Pigment Dispersant | 0.15 | 0.15 | 0.15 |
| Silica | 0.5 | 0.5 | 0.5 |
| Isobutanol | 5 | 5 | 5 |
| Cymel U 1051 Crosslinker | 14.6 | 14.6 | 10.8 |
| Silane Defoamer | 0.2 | 0.2 | 0.2 |
| Silicone Anti-Cratering Additive | 0.1 | 0.1 | 0.1 |
| Air Release Agent | 0.1 | 0.1 | 0.1 |
| UV Stabilizer | 0.2 | 0.2 | 0.2 |
| Butyl Acetate | 19.93 | 19.93 | 23.73 |
| Methyl Ethyl Ketone | 13.3 | 13.3 | 13.3 |
| Acetone | 10 | 10 | 10 |
| Para-Toluene Sulfonic Acid | 3 | 3 | 2 |
| Total | 103 | 103 | 102 |

The Example 2 composition contained lower amounts of the crosslinker and acid catalyst than in the Comparison Example 2 and Comparison Example 3 compositions, and its butyl acetate content was accordingly increased so that the relative proportion of the remaining ingredients would be approximately unchanged.

One to three coats of the Table 2 coating compositions were applied to end grain surfaces of alder wood panels at a 0.03 mm wet coating thickness. The cured coatings were subjectively evaluated to assess the cured coating appearance, using a zero to five scale in which zero represented a coating which had completely soaked into the wood and five represented a coating forming a smooth, glossy film. The results are shown below in Table 3 and in FIG. 3 through FIG. 8.

TABLE 3

Figure 3:
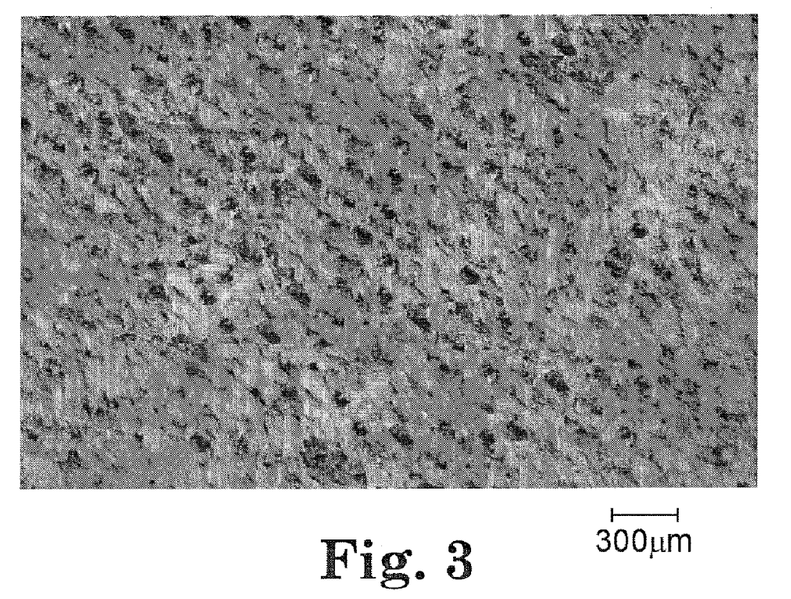
FIG. 3 through FIG. 8 are photographs of end grain surfaces of alder wood panels coated with various alkyd coating compositions.
Figure 4:
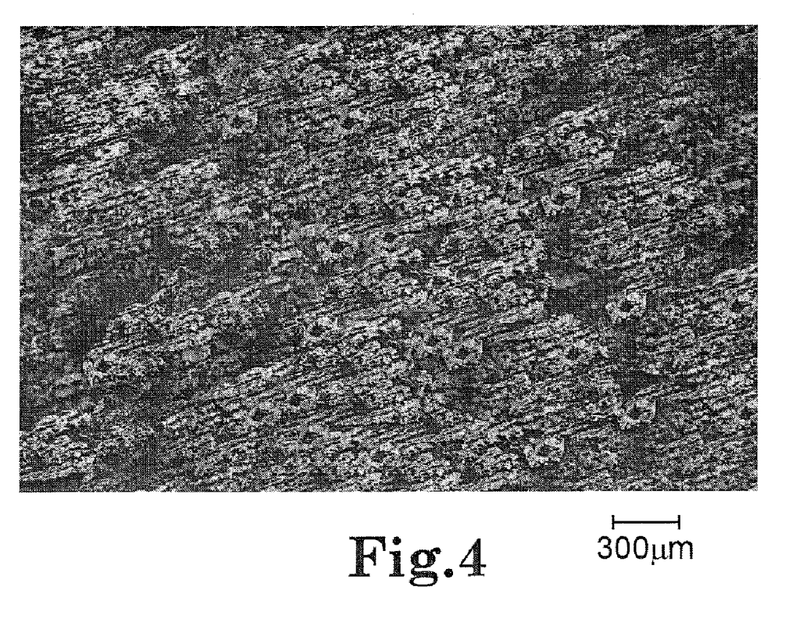
Figure 5:
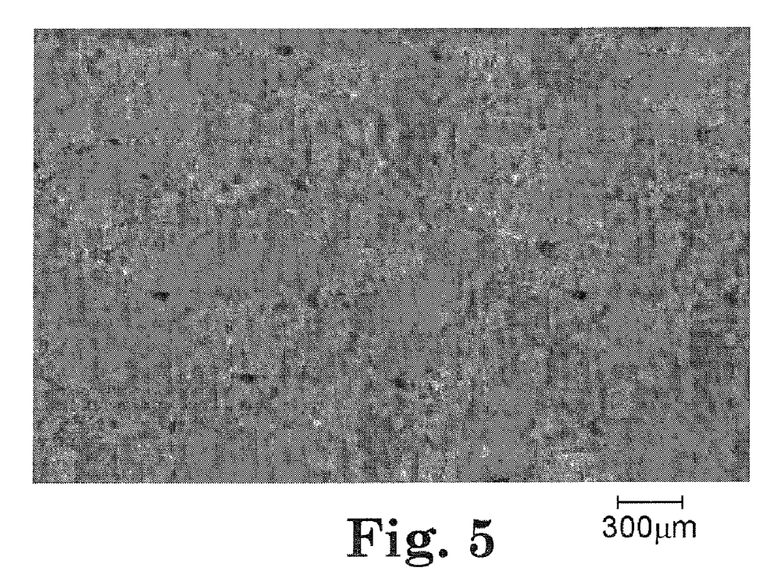
Figure 6:
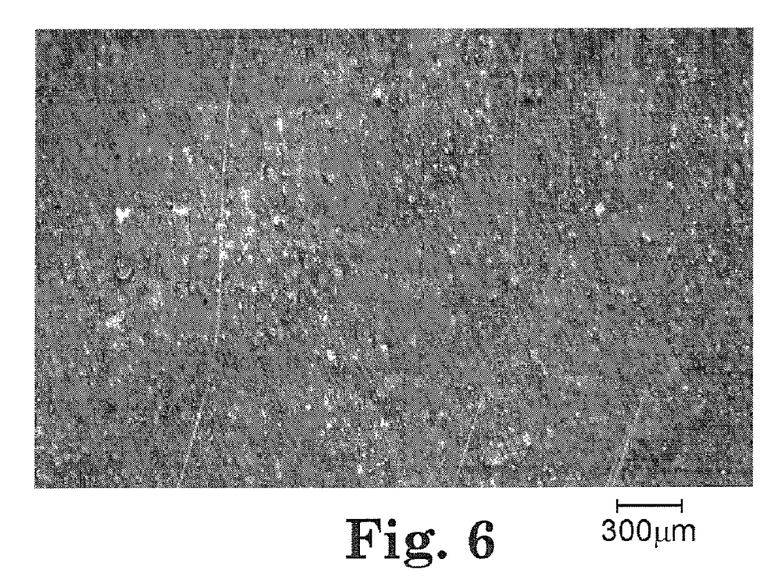
Figure 7:
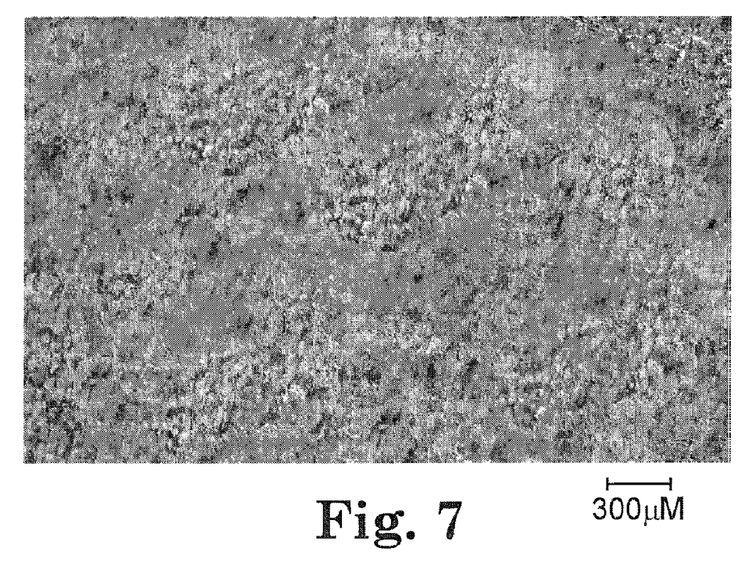
Figure 8:
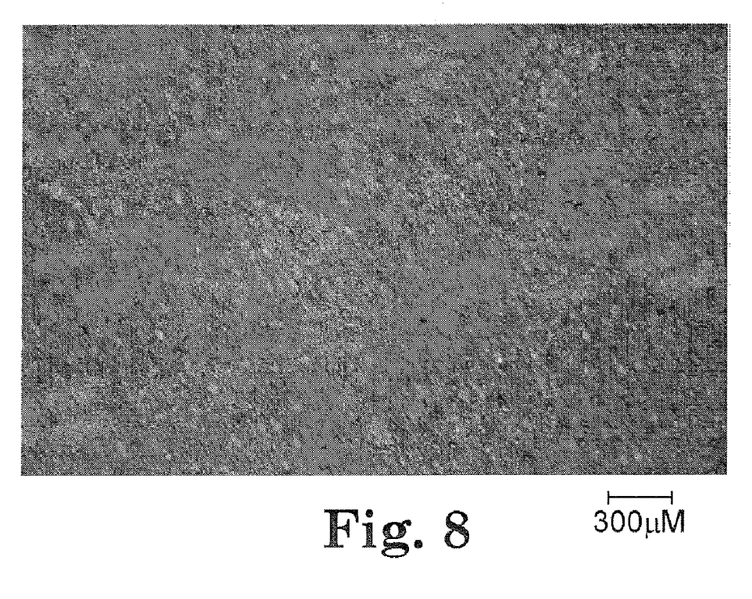

| | Comparison Example 2 | | Comparison Example 3 | | Example 2 | |
|---|---|---|---|---|---|---|
| Number of Coats | 1 | 3 | 1 | 3 | 1 | 2 |
| Appearance Rating | 0 | 5 | 0 | 4 | 3 | 5 |
| Drawing Figure | FIG. 3 | FIG. 4 | FIG. 5 | FIG. 6 | FIG. 7 | FIG. 8 |

Complete strikethrough (viz., the applied coating appeared to have been completely absorbed by the wood) was observed in FIG. 3 and FIG. 5, and a frosty appearance was observed over at least part of the applied coating in FIG. 4, FIG. 6 and to a small extent in FIG. 7. The Example 2 coating composition exhibited a better appearance after a single coat than either Comparison Example 2 or Comparison Example 3. Two coats of the Example 2 coating composition exhibited at least as good an appearance as that obtained after three coats of the Comparison Example 2 coating composition, and a better appearance than that obtained after three coats of the Comparison Example 3 coating composition. The Example 2 coating composition accordingly reduced by at least one third the time and material required to obtain an acceptable cured finish on alder end grain.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A method for coating a wood substrate comprising an exposed end grain portion of low density or porous wood, which method comprises applying to such substrate a solvent-borne coating composition comprising an (i) alkyd resin having a hydroxyl number less than about 150 and a number average molecular weight of at least about 2,000, (ii) acid catalyst and (iii) crosslinker.

2. A method according to claim 1 wherein the wood comprises alder, birch, pine, poplar, or soft maple.

3. A method according to claim 1 wherein the wood comprises engineered wood.

4. A method according to claim 1 wherein the wood comprises fiberboard.

5. A method according to claim 1 wherein the hydroxyl number is about 50 to about 150.

6. A method according to claim 1 wherein the hydroxyl number is about 80 to about 140.

7. A method according to claim 1 wherein the alkyd resin number average molecular weight is between about 2,000 and about 7,000.

8. A method according to claim 1 wherein the alkyd resin number average molecular weight is between about 2,500 and about 5,000.

9. A method according to claim 1 wherein the alkyd resin has a Gardner coloration less than about 3.

10. A method according to claim 1 wherein the alkyd resin is a short oil alkyd based on coconut oil.

11. A method according to claim 1 wherein a 70 weight % solution of the alkyd resin in a 28:2 by weight butyl acetate: xylene mixture has a kinematic viscosity greater than about 37 Stokes and less than about 95 Stokes.

12. A method according to claim 1 wherein the acid catalyst comprises a sulfonic acid.

13. A method according to claim 1 wherein the crosslinker comprises a formaldehyde-releasing methylated amino resin.

14. A method according to claim 13 wherein the crosslinker is less than about 14 weight percent of the coating composition.

15. A method according to claim 13 wherein the coating composition releases less formaldehyde during crosslinking than an otherwise similar coating composition made using an alkyd resin having a hydroxyl number greater than 150.

16. A method according to claim 1 wherein the coating composition requires fewer coats to provide a glossy continuous cured finish on alder end grain compared to an otherwise similar coating composition made using an alkyd resin having a hydroxyl number greater than 150 and a number average molecular weight of at least about 2000.

17. A coated wood article comprising an end grain portion of low density or porous wood, such portion having thereon a coating composition comprising an (i) alkyd resin having a hydroxyl number less than about 150 and a number average molecular weight of at least about 2000, (ii) acid catalyst and (iii) crosslinker.

18. A coating composition comprising (i) an alkyd resin having a hydroxyl number less than about 150, number average molecular weight greater than about 2000 and Gardner coloration less than about 3, together with (ii) an acid catalyst and (iii) alkylated amino resin crosslinker.

19. A coating composition according to claim 18 wherein the hydroxyl number is about 50 to about 150 and the alkyd resin number average molecular weight is between about 2,000 and about 7,000.

* * * * *